March 28, 1939.  L. E. PERRY  2,152,104

CALCULATING DEVICE

Filed March 15, 1937  2 Sheets-Sheet 1

INVENTOR:

ATTORNEY.

March 28, 1939.  L. E. PERRY  2,152,604
CALCULATING DEVICE
Filed March 15, 1937   2 Sheets-Sheet 2

INVENTOR:
Lester E. Perry
BY Francis M. Crawford
ATTORNEY.

Patented Mar. 28, 1939

2,152,604

UNITED STATES PATENT OFFICE 2,152,604

CALCULATING DEVICE

Lester E. Perry, Maywood, Ill., assignor to Commercial Solvents Corporation, Terre Haute, Ind., a corporation of Maryland Application March 15, 1937, Serial No. 130,932

4 Claims. (Cl. 235—89)

My invention relates to calculating devices and, more particularly, to a calculating device for readily determining the amount of solute required to adjust a given quantity of solution to a desired concentration.

In adjusting the concentration of solutions in which the initial concentration of the solute may vary over a wide range, from 0% upward, and the volume of which may vary over a considerable range, it is necessary to calculate separately each individual case or else refer to tabulated data covering all possible combinations. In the case of solutions of liquid solutes in which there is a diminution of volume on admixture of solvent and solute, the calculation becomes so involved as to practically require the use of tables. In view of the plurality of variables involved, it has been found necessary to employ a large number of separate tables of the necessary data or a complicated chart or nomograph which is difficult to read under practical working conditions. Thus in the case of alcohol anti-freeze solutions, in adjusting a radiator solution from one freezing point to a lower freezing point, it has been necessary to utilize a complicated chart or set of tables, or else resort to trial and error. In view of the inconvenience of such a set of tables, or the difficulty of reading a complex chart, the latter method has commonly been employed up to the present time.

I have now discovered that the necessary data for adjusting the concentration of solutions, such as radiator anti-freeze solutions, may very conveniently be presented in a simple and compact calculator. The calculator of my present invention may be defined, briefly, as comprising a member carrying indicia representing correlated present and desired concentrations, a second member carrying correlated indicia representing volumes of solution and amounts of solute, the said members being movable relative to each other, and the said first member being apertured whereby one of the indicia carried by said second member, representing a volume of solution is visible when the corresponding indicia carried by said second member, representing amounts of solute, are visible adjacent the indicia carried by said first member.

Figures 1, 2, 3:
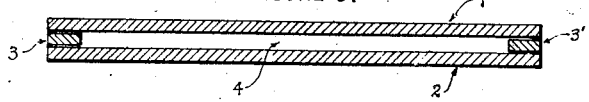
Figure 4:
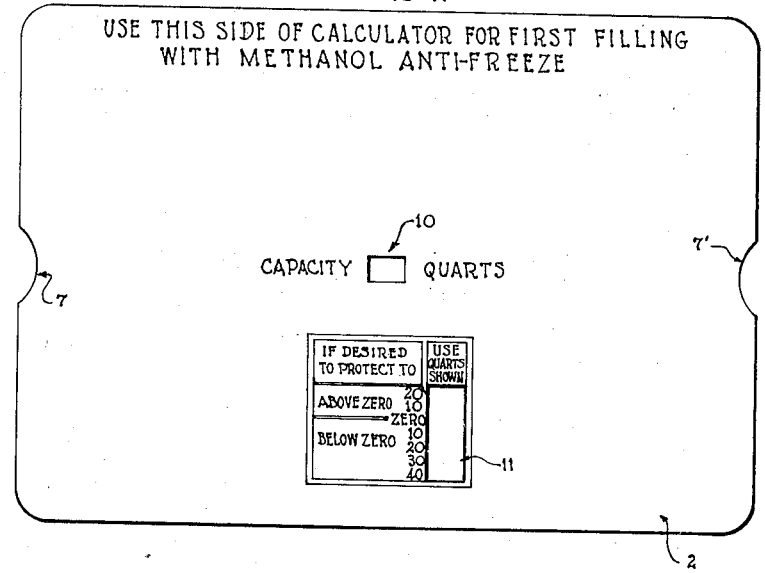
Figure 5:
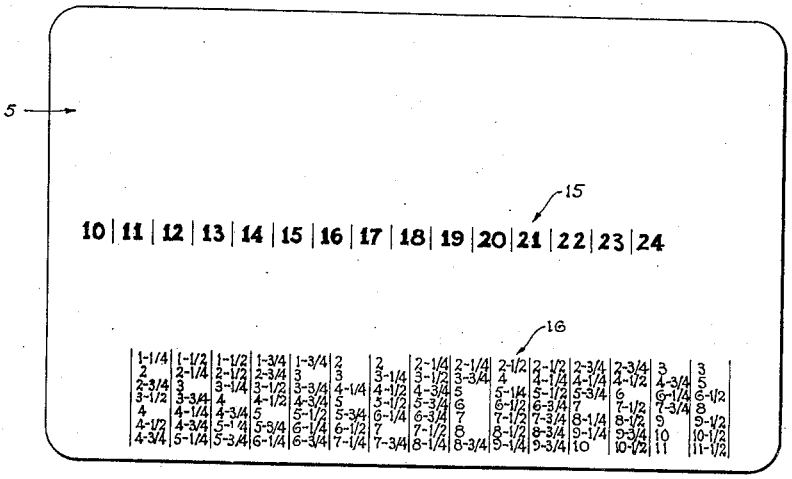

My invention will be illustrated by reference to one modification of the calculator which is illustrated in the accompanying drawings. In these drawings Figure 1 is a plan view of the calculator showing one of the face members thereof; Figure 2 represents one face of the slide member; Figure 3 is a sectional end view of the calculator with the slide member removed; Figure 4 is a plan view of the second face member of the calculator, and Figure 5 represents the second face of the slide member.

In this modification of the calculator a slide rule type of structure is secured in which a slide member reciprocates between two apertured face members. The face members 1 and 2, which may comprise cards of stiff paper board or sheets of other relatively stiff and light weight material, are preferably secured together with inter-positioned strips 3—3', defining a longitudinally extending slot or channel 4 in which the slide member 5 may reciprocate. The face members may be cut away, as shown at 6—6' and 7—7', to facilitate manual engagement of the slide when it is in its innermost position. The face members are provided with apertures or windows 8, 9, 10, and 11, which in each instance extend through the wall of the face member and into the slot or channel so that indicia carried by the slide member can readily be seen therethrough.

The illustrated modification of the calculator is designed for calculating the amount of methanol required for adjusting various volumes of anti-freeze solution to the desired freezing point. For this purpose the face of the slide member 5, illustrated in Figure 2, carries a longitudinal row of figures 12 representing various volumes of the anti-freeze solution, i. e., various radiator capacities. These figures are so placed as to be in register with the aperture 8 of the face member 1 when the slide member 5 is in operating position.

The face member 1 is provided with a table of data 13, adjacent the aperture 9 showing correlated present and desired freezing points of the solution. The face of the slide member 5, illustrated in Figure 2, is provided with a table of data 14, representing volumes of methanol, in quarts, to be added to the radiator solution to give the desired freezing point. The table 14 is so positioned as to be in register with the aperture 9 of the face member 1 when the slide member 5 is in operating position, whereby one vertical column of the table is visible through the said aperture 9.

The longitudinal row of figures 12 and the vertical columns of the table 14 carried by the face of the slide member 5, illustrated in Figure 2, are correlated, as to position, whereby when any given volume figure is visible through the aperture 8, the corresponding vertical column of the table 14 is visible through the aperture 9.

In this manner it is possible to set the slide member 5 so that the radiator capacity of the car, in quarts, is shown through the aperture 8, and the amount of methanol to be added to the radiator solution is then shown through the aperture 9 in horizontal register with the correlated present and desired freezing points of the radiator solution shown in the table 13.

The second face of the slide member 5, illustrated in Figure 5, is similarly provided with a longitudinal row of figures 15, representing radiator capacities, and a table of data 16, representing amounts of methanol to be added. The row of figures 15 and the table 16 are positioned to register with the apertures 10 and 11 of face member 2 when the slide member 5 is in operating position. The figures of the longitudinal row 15 and the vertical columns of the table 16 are correlated, as to position, such that when a given radiator capacity is visible through the aperture 10, the corresponding vertical column of the table 16 is visible through the aperture 11. The face member 2 carries a table of freezing points adjacent the aperture 11, in this case all of said freezing points being correlated to an initial freezing point of 32° F. Thus, face member 2 and the corresponding face of the slide member 5 are utilized for determining the amount of methanol required for the initial preparation of an antifreeze solution; whereas, face member 1 and its corresponding face of the slide member 5 are utilized to calculate the amount of methanol necessary to adjust to a lower freezing point a solution which already contains some methanol.

The operation of face member 2 and its corresponding face of the slide member 5 is identical with that previously described for face member 1. In this case the slide member 5 is adjusted so that the radiator capacity of the car is visible through the aperture 10, and the required amounts of methanol will then be visible through the aperture 11 in horizontal register with the desired freezing points, which are carried by the face member 2 adjacent the aperture 11.

It may be seen that the modification of my invention described above is advantageous from the standpoint of compactness and ease of operation. A device of this character is particularly advantageous for use under practical working conditions such as encountered in filling station servicing of automobiles for anti-freeze protection. With the use of this device only the necessary minimum amount of data is visible at any one setting of the device, and the results are obtainable by reading columns of figures immediately adjacent to each other, thus eliminating the errors involved in the use of large and complicated charts. A further advantage of this device for uses such as the adjustment of antifreeze solutions, is that very little of the area of the face members is required for the indicia appearing on these members, with the result that considerable space is available for printing directions for using the calculator, tables of radiator capacities of various makes and models of automobiles, advertising matter, etc. Other advantages of this device will have been apparent from the preceding description.

It will be evident, of course, that the particular exemplification of my invention, described above and shown in the drawings, is illustrative only and that my invention is not limited to this specific structure. It will be apparent to one skilled in the art that the structure shown could be modified in numerous respects. For example, the apertures in the face members might be placed toward the ends rather than centrally, and the slide could then be designed to operate only from one end of the calculator rather than from both ends, as shown. Likewise, the data on both faces of the slide member could be combined on one face member by adding to the table 13, of face member 1, another horizontal section comprising desired freezing points correlated with the present freezing point of 32° above zero. Similarly, the indicia carried by the face members and slide could represent volumes, solute concentrations, and the quantities of additional solute for any type of solution desired to be adjusted, instead of the particular indicia shown for the methanol anti-freeze solutions. It will also be apparent that the physical structure could be modified in numerous respects as long as there are provided two members carrying the necessary indicia movable relative to each other, one of said members being apertured in a manner to permit operation as described above. In general, it may be said that any modifications or equivalents which would naturally occur to one skilled in the art are included within the scope of my invention.

My invention now having been described, what I claim is:

1. A device for calculating the amount of a solute required to adjust a given volume of a solution to a desired concentration, comprising a member carrying indicia representing correlated present and desired concentrations, a second member carrying correlated indicia representing volumes of solution and amounts of solute to be added, the said members being movable relative to each other, and the said first member being apertured whereby when one of the indicia carried by said second member, representing a volume of solution, is visible, the corresponding indicia carried by said second member, representing amounts of solute to be added, are visible adjacent the indicia carried by said first member.

2. A device for calculating the amount of an anti-freeze required to adjust a given volume of an anti-freeze solution to a desired freezing point, comprising a member carrying indicia representing correlated present and desired freezing points, a second member carrying correlated indicia representing volumes of anti-freeze solution and amounts of anti-freeze to be added, the said members being movable relative to each other, and the said first member being apertured whereby when one of the indicia carried by said second member, representing a volume of anti-freeze solution, is visible, the corresponding indicia carried by said second member, representing amounts of anti-freeze to be added, are visible adjacent the indicia carried by said first member.

3. A device for calculating the amount of a solute required to adjust a given volume of a solution to a desired concentration, comprising two face members positioned in spaced relation and defining a channel therebetween, the said face members carrying indicia representing correlated present and desired concentrations, a slide member carrying correlated indicia representing volumes of solution and amounts of solute to be added, said slide member being adapted to reciprocate in the channel between said face members, and said face members being apertured whereby when one of the indicia carried by said slide member, representing a volume of solution, is visible through an aperture in one of said face members, the corresponding indicia carried by said slide member, representing amounts of solute to be added, are visible through an aperture adjacent the indicia carried by said face member.

4. A device for calculating the amount of an anti-freeze required to adjust a given volume of anti-freeze solution to a desired freezing point, comprising two face members positioned in spaced relation and defining a channel therebetween, said face members carrying indicia representing correlated present and desired freezing points, a slide member carrying correlated indicia representing volumes of anti-freeze solution and amounts of anti-freeze to be added, said slide member being adapted to reciprocate in the channel between the said face members, and the said face members being apertured whereby when one of the indicia carried by said slide member, representing a volume of anti-freeze solution, is visible through an aperture in one of the face members, the corresponding indicia carried by said slide member, representing amounts of anti-freeze to be added, are visible through an aperture adjacent the indicia carried by said face member.

LESTER E. PERRY.